United States Patent
Itoh

(10) Patent No.: US 10,013,791 B2
(45) Date of Patent: Jul. 3, 2018

(54) IMAGE PROCESSING APPARATUS AND METHOD THEREFOR

(71) Applicant: CANON KABUSHIKI KAISHA, Tokyo (JP)

(72) Inventor: Yasuhiro Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 14/849,980

(22) Filed: Sep. 10, 2015

(65) Prior Publication Data

US 2016/0093091 A1 Mar. 31, 2016

(30) Foreign Application Priority Data

Sep. 30, 2014 (JP) .................................. 2014-202120

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01)

(58) Field of Classification Search
CPC ..................................................... G06T 15/06
See application file for complete search history.

(56) References Cited

U.S. PATENT DOCUMENTS

| | | | | |
|---|---|---|---|---|
| 2006/0274065 A1* | 12/2006 | Buyanovskiy | .......... | G06T 15/06 345/424 |
| 2009/0102943 A1* | 4/2009 | Hattori | .................. | H04N 9/735 348/223.1 |
| 2011/0122135 A1* | 5/2011 | Kim | .......................... | G06T 1/20 345/426 |
| 2012/0033195 A1* | 2/2012 | Tai | ........................... | F41G 1/38 356/4.01 |
| 2012/0168636 A1* | 7/2012 | Ha | ........................ | G01T 1/2985 250/394 |
| 2013/0069970 A1* | 3/2013 | Sasaki | ..................... | G09G 5/02 345/589 |
| 2015/0215512 A1* | 7/2015 | Gautron | ................. | G06T 15/50 348/234 |

FOREIGN PATENT DOCUMENTS

JP 2011-017541 A 1/2011

OTHER PUBLICATIONS

Marc Levoy, Volume rendering by adaptive refinement, The Visual Computer: International Journal of Computer Graphics, v.6 n. 1, p. 2-7, 1990.*

Frederic I. Parke, Keith Waters, Computer Facial Animation, Second Edition, A.K. Peters Ltd., Boston Massachusetts, ISBN 1978-1-56881-448-3 Hardcover, pp. 454, 2008, p. 194.*

Pighin, F. P., Lischinski, D., and Salesin, D. 1997. Progressive previewing of ray-traced images using image plane discontinuity meshing. Eurographics Rendering Workshop (Jun. 1997), 115-126. ISBN 3-211-83001-4. Held in St. Etienne, France.*

* cited by examiner

*Primary Examiner* — Kee M Tung
*Assistant Examiner* — Grace Q Li
(74) *Attorney, Agent, or Firm* — Fitzpatrick, Cella, Harper & Scinto

(57) ABSTRACT

Spectral radiance data is calculated by performing ray tracing from a viewpoint for each pixel of an image of a scene, based on light source characteristics and object information in the scene. Either a spatial-based collection of the spectral radiance data or a wavelength-based collection of the spectral radiance data is performed to generate preview data of the image of the scene, during performing of the ray tracing.

19 Claims, 12 Drawing Sheets

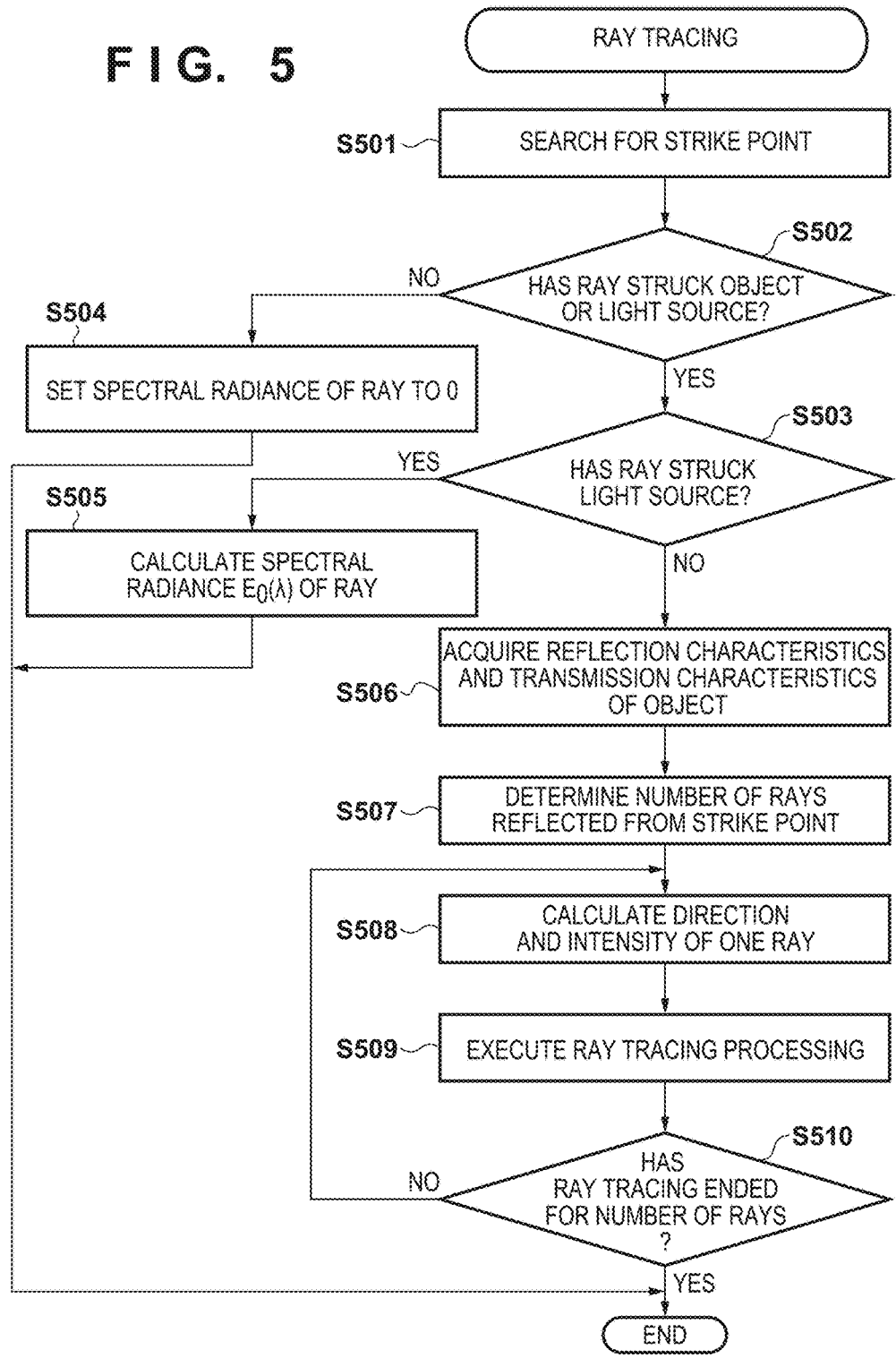

IMAGE PROCESSING APPARATUS AND METHOD THEREFOR

BACKGROUND OF THE INVENTION

Field of the Invention

The present invention relates to image processing of rendering a scene using a ray tracing method.

Description of the Related Art

Computer graphics (CG) is used in various fields, and is widely used even in a design field. In the design field, a technique of generating an image more faithful to an actual object is required.

As a technique of generating a video faithful to an actual object using CG, there has been proposed a rendering method using the ray tracing method, as described in Japanese Patent Laid-Open No. 2011-017541 (patent literature 1). It is becoming possible to implement a new visual expression by compositing CG and a photographed image captured by a digital camera, a digital video camera, or the like.

To reproduce a scene faithful to an actual object by CG and composite the scene and a photographed image, it is important that the scene is faithful to the actual object, as a matter of course, and it is also important to perform composition processing in consideration of the characteristics of a device which has captured the photographed image. The method described in patent literature 1 requires an enormous calculation time to generate CG by a computer. A user needs a very long time to set the rendering conditions of CG, for example, adjust illumination conditions necessary for composition of CG and a photographed image by trial and error.

SUMMARY OF THE INVENTION

In one aspect, an image processing apparatus for generating an image of a scene, comprising: a first calculation unit configured to calculate spectral radiance data by performing ray tracing from a viewpoint for each pixel of an image of a scene, based on light source characteristics and object information in the scene; and a generation unit configured to perform either a spatial-based collection of the spectral radiance data or a wavelength-based collection of the spectral radiance data to generate preview data of the image of the scene, during performing of the ray tracing.

According to the aspect, when generating an image of a scene by ray tracing, it is possible to efficiently obtain a preview image of the scene during processing, thereby enabling the user to set rendering conditions by observing the preview image during the processing.

Further features of the present invention will become apparent from the following description of exemplary embodiments with reference to the attached drawings.

BRIEF DESCRIPTION OF THE DRAWINGS

FIG. 5 is a flowchart illustrating ray tracing processing.

DESCRIPTION OF THE EMBODIMENTS

The present invention will be described in detail below based on preferred embodiments of the present invention with reference to the accompanying drawings. Note that arrangements to be described in the following embodiments are merely examples, and the present invention is not limited to the illustrated arrangements.

First Embodiment

Prior to a description of the embodiment, the behavior of light which is different depending on the wavelength will be explained. Upon striking an object, light is split into light reflected by the surface of the object and light transmitted through the object. The refractive angle of the light transmitted through the object changes depending on a spectral refractive index corresponding to the wavelength of the light. For example, when a ray having passed through a space having a spectral refractive index of $n_1(\lambda)$ is transmitted through an object having a spectral refractive index of $n_2(\lambda)$, a refractive angle $\theta W$ is given by:

$$\theta(\lambda) = \sin^{-}\{(n1(\lambda)/n2(\lambda)) \cdot \sin \phi\} \quad (1)$$

where $\phi$ represents the incidence angle of the ray with respect to the object.

Since the refractive angle is a function of the wavelength $\lambda$ of light, the path of the light traced by the ray tracing method changes depending on the wavelength. To faithfully reproduce light transmission, it is necessary to handle light as spectra, and reproduce a color from a plurality of rays.

To correctly reproduce a color, it is necessary to perform ray tracing for all the wavelengths of light emitted from a light source. It is inappropriate to perform ray tracing for all the wavelengths since a calculation amount becomes too large. In fact, therefore, representative wavelengths of a ray are extracted to perform ray tracing, and an image is generated based on ray tracing results.

[Apparatus Arrangement]

Figure 1:
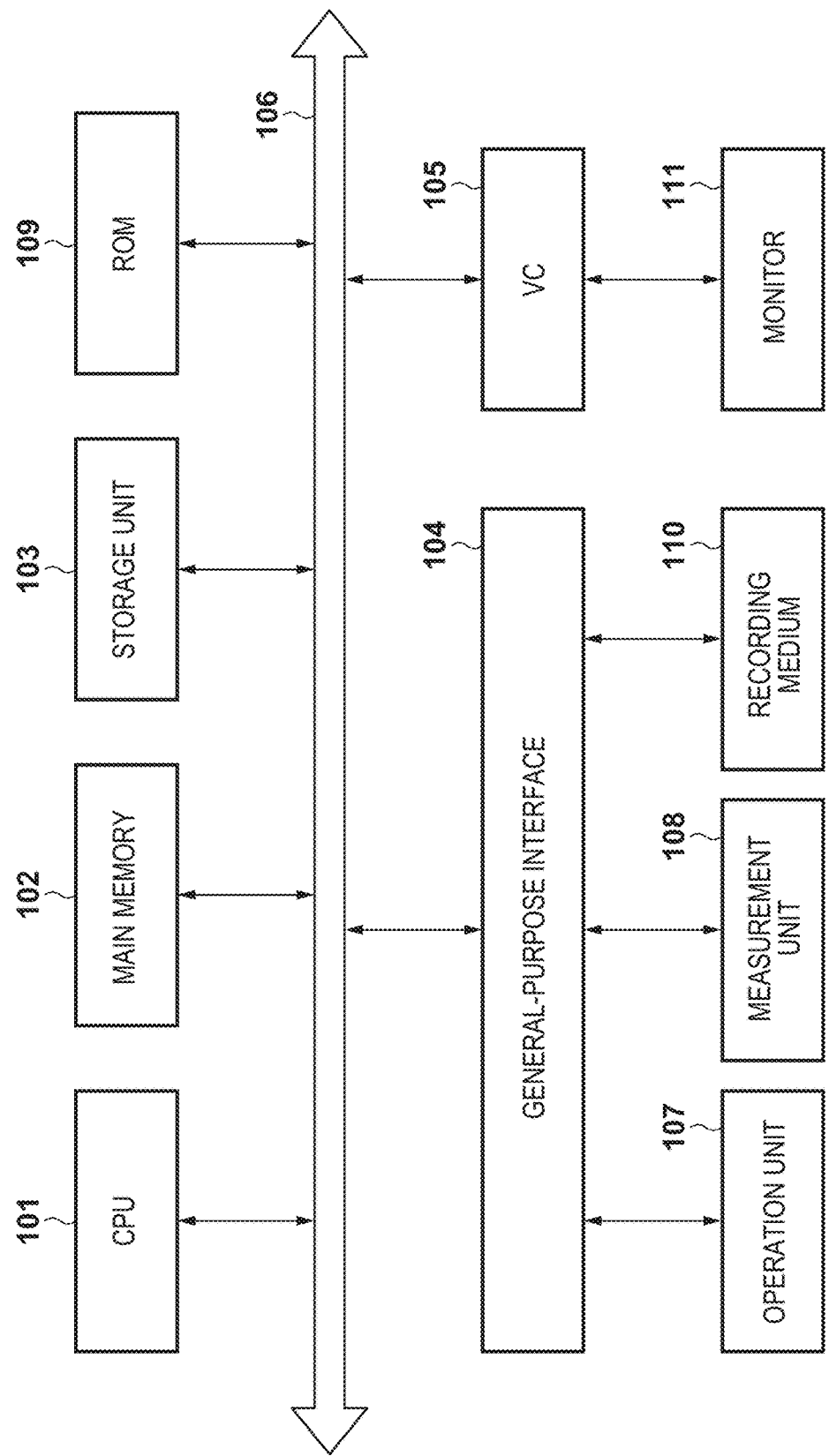
FIG. 1 is a block diagram showing the arrangement of an information processing apparatus according to an embodiment.

FIG. 1 shows an example of the arrangement of an information processing apparatus for executing image processing according to the embodiment.

A microprocessor (CPU) 101 executes an operating system (OS) and programs stored in a read only memory (ROM) 109 and a storage unit 103 using a main memory 102 such as a random access memory (RAM) as a work memory, thereby controlling components (to be described later) through a system bus 106. Note that the storage unit 103 is a hard disk drive (HDD), a solid-state drive (SSD), a flash memory, or the like, and stores programs for implementing color processing (to be described later) and various data.

An operation unit 107 such as a keyboard and mouse, a measurement unit 108 such as a spectral measurement device, a recording medium 110 such as a memory card or USB memory, and the like are connected to a general-purpose interface (I/F) 104 such as USB (Universal Serial Bus) or IEEE1394. A monitor 111 is connected to a video card (VC) 105. The CPU 101 displays, on the monitor 111, a user interface (UI) and information indicating the progress of processing, the result of processing, and the like.

For example, in accordance with a user instruction input through the operation unit 107, the CPU 101 loads, into a predetermined area of the main memory 102, an application program (AP) stored in the storage unit 103 or the recording medium 110. The CPU 101 executes the AP to display a UI on the monitor 111 in accordance with the AP.

In accordance with an operation of the UI by the user, the CPU 101 inputs various data stored in the storage unit 103 or the recording medium 110 and measurement data from the measurement unit 108, and loads them into a predetermined area of the main memory 102. In accordance with the AP, the CPU 101 performs predetermined arithmetic processing for the various data loaded in the main memory 102. In accordance with an operation of the UI by the user, the CPU 101 displays the arithmetic processing result on the monitor 111, and stores it in the storage unit 103 or the recording medium 110.

Note that the CPU 101 can transmit/receive programs, data, and arithmetic processing results to/from a server apparatus on a wired or wireless network through a network I/F (not shown) connected to the system bus 106. A tablet computer can also be used as an information processing apparatus. In this case, a touch panel overlaid on the screen of the monitor 111 serves as the operation unit 107.

Image processing in which an image processing AP generates an image and displays it on the monitor 111 based on a command from the CPU 101 in the above-described arrangement will be explained below.

Processing Arrangement

Figure 2:
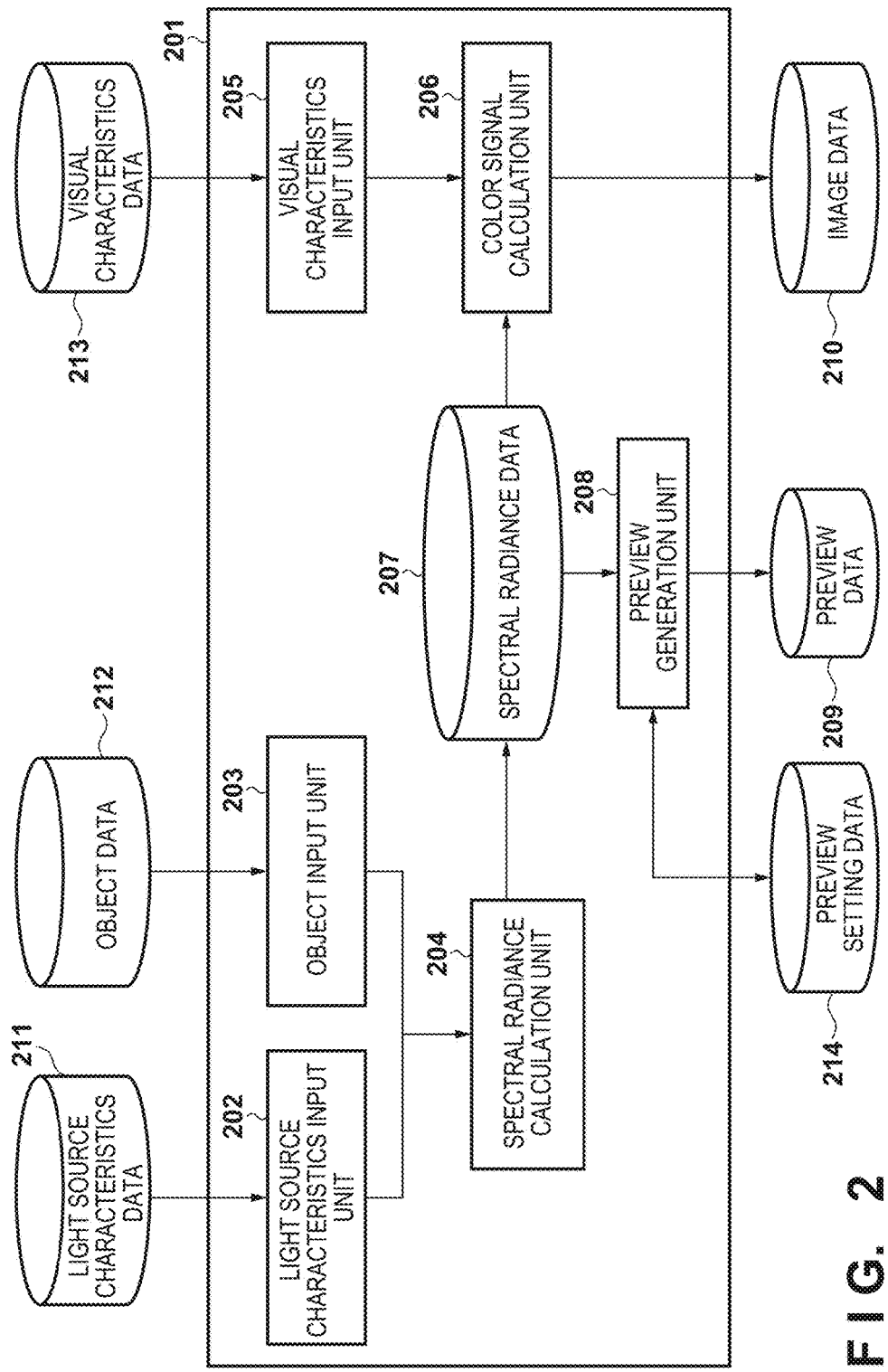
FIG. 2 is a block diagram showing the processing arrangement of an image processing apparatus according to the first embodiment.

FIG. 2 is a block diagram showing the processing arrangement of an image processing apparatus 201 according to the first embodiment. As described above, the processing arrangement shown in FIG. 2 is implemented as the image processing AP. In the first embodiment, the image processing apparatus 201 for displaying the progress of generation of CG generated by the ray tracing method will be described.

Referring to FIG. 2, a light source characteristics input unit 202 inputs light source characteristics data 211 indicating the arrangement, light distribution characteristics, and the like of a light source in a scene. An object input unit 203 inputs object data 212 indicating the arrangement, shape, color, material appearance (visual perception of the material), and the like of each object forming the scene. A visual characteristics input unit 205 inputs visual characteristics data 213 indicating color matching functions and the like. Note that the light source characteristics data 211, object data 212, and visual characteristics data 213 may be input from the storage unit 103, the recording medium 110, or another apparatus connected through the general-purpose interface 104.

In accordance with an instruction from the CPU 101, based on the object data 212 and light source characteristics data 211, a spectral radiance calculation unit 204 calculates the spectral radiance of each pixel of CG to be composited. This calculation result is temporarily saved as spectral radiance data 207 in the main memory 102 or storage unit 103. A color signal calculation unit 206 calculates the color signal values (sRGB or the like) of each pixel based on the spectral radiance data 207 and visual characteristics data 213 in accordance with an instruction from the CPU 101, and outputs image data 210 as CG. The image data 210 is stored in the storage unit 103 or the like, and also displayed on the monitor 111.

A preview generation unit 208 reconstructs an image based on the spectral radiance data 207 and preview setting data 214 to generate preview data 209 for preview display, thereby displaying the reconstructed image on the monitor 111. The preview setting data 214 includes a "preview contents flag" indicating the confirmation contents (the shape or material appearance of the object) of the user by a CG preview. The preview setting data 214 includes information such as a "rendering result display flag" indicating whether a rendering result can be used intact for preview display and a "reduction ratio" indicating the degree of reduction of the image when the rendering result cannot be used intact for preview display. Note that the rendering result display flag and reduction ratio are updated according to the current degree of progress of CG generation, but a predetermined initial value is set before the start of the processing. Note also that the preview contents flag can be input from the main memory 102, storage unit 103, recording medium 110, or the like, or set from the keyboard and mouse of the operation unit 107 connected to the general-purpose interface 104 or the like.

[CG Generation Processing]

Figure 3:
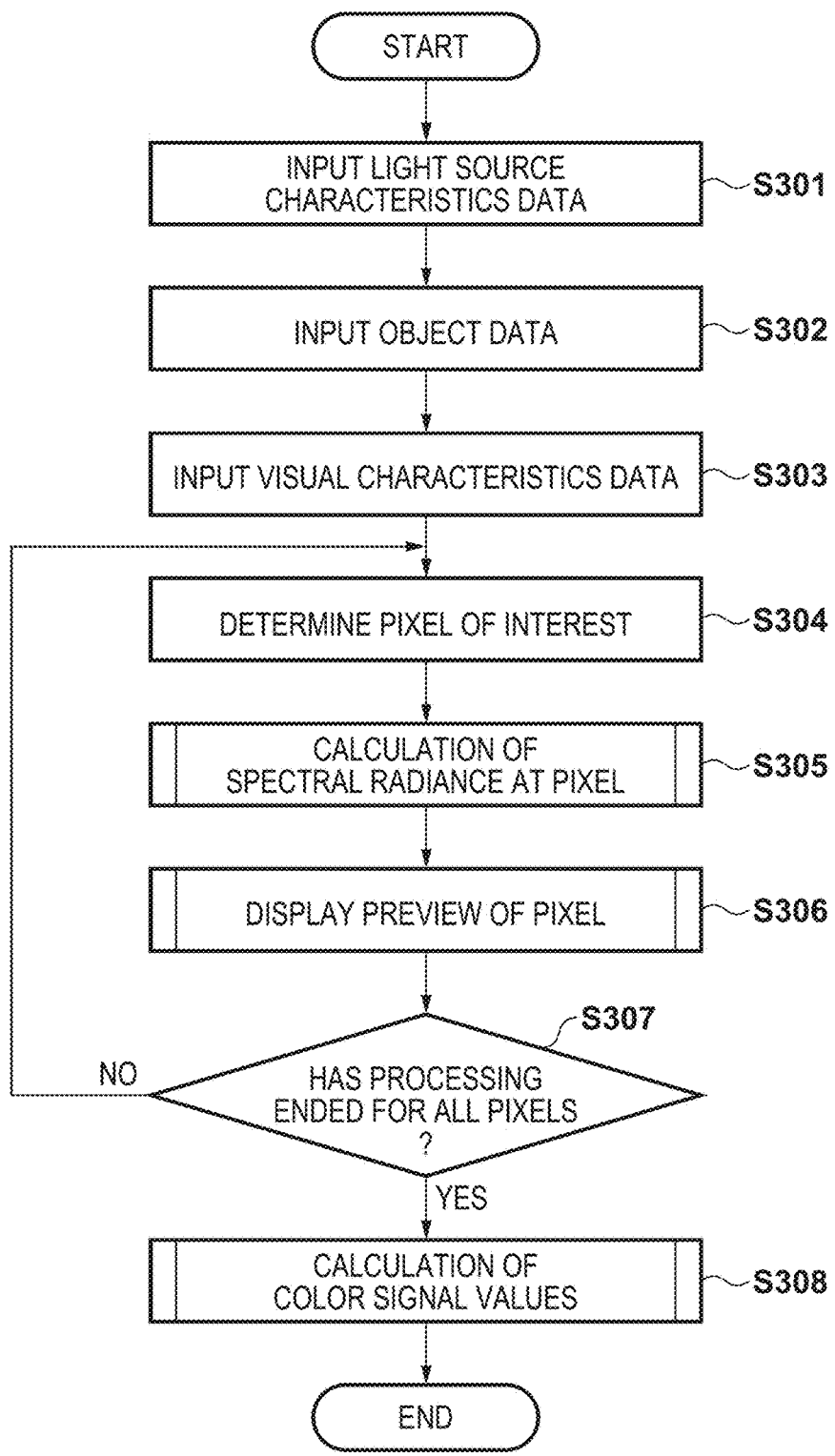
FIG. 3 is a flowchart illustrating CG generation processing.

CG generation processing in the image processing apparatus 201 having the arrangement shown in FIG. 2 will be described below with reference to a flowchart shown in FIG. 3. In the first embodiment, when generating CG, preview display is performed every time one pixel is processed.

The light source characteristics input unit 202 loads the light source characteristics data 211 (S301). The light source characteristics data 211 indicates the light distribution characteristics and spectral radiance of the light source which illuminates the scene.

The object input unit 203 loads the object data 212 (S302). The object data 212 indicates the position, size, reflection characteristics, and the like of each object in the scene in CG to be generated.

The visual characteristics input unit 205 inputs the visual characteristics data 213 (S303). The visual characteristics data 213 is used to convert the spectral radiance into the color signal values of the image, and indicates, for example, color matching functions. The color matching functions represent the sensitivity of an eye to light in the visible light range, and are, for example, the color matching functions of the CIEXYZ color system. Note that data stored in advance in the storage unit 103 or the like is input as visual characteristics data.

Then, the spectral radiance calculation unit 204 determines a pixel (to be referred to as a "pixel of interest" hereinafter) subjected to calculation of a spectral radiance in an output image (S304). Note that the pixel of interest may be selected in an arbitrary order.

The spectral radiance calculation unit 204 calculates the spectral radiance data 207 indicating the spectral radiance at the pixel of interest (S305). The ray tracing method is used to calculate the spectral radiance, and details thereof will be described later. Next, the preview generation unit 208 generates the preview data 209 of the pixel of interest based on the spectral radiance data 207, and displays it on the monitor 111 (S306). Details of the preview display processing will be described later.

It is determined whether the spectral radiance calculation unit 204 has performed calculation of the spectral radiance data 207 and generation and display of the preview data 209 for all the pixels of the image data 210 (S307). If the processing has not been performed for all the pixels, the process returns to step S304 to determine the next pixel of interest, and continues. Alternatively, if the processing has been performed for all the pixels, the color signal calculation unit 206 calculates color signal values from the spectral radiance data 207 for all the pixels to generate the image data 210. Details of a color signal value calculation method will be described later.

Overview of Preview Display

Figure 4A:
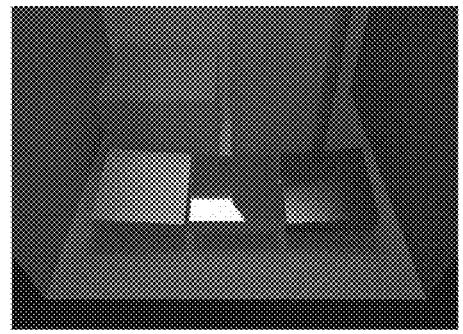
FIGS. 4A and 4B are views each showing an overview of preview display.
Figure 4B:
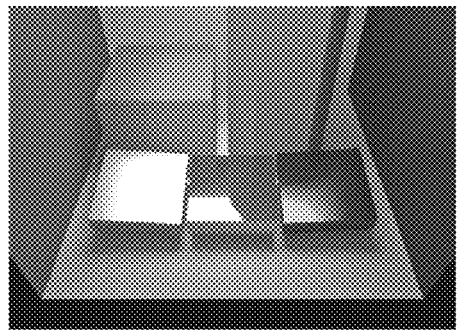

An overview of preview display will be described with reference to FIGS. 4A and 4B. FIGS. 4A and 4B are views each showing an example of preview display during the generation processing of a general ray tracing image.

FIG. 4A shows a display example immediately after the start of ray tracing. In general, in the ray tracing method, an image is generated by processing a large number of trajectories of rays emitted from the light source. Therefore, immediately after the start of ray tracing, the entire image is dark, and light does not reach everywhere.

When the processing progresses and image generation is almost complete, an image is displayed as shown in FIG. 4B. As the display is closer to that shown in FIG. 4B, it is easier to grasp the shape, material appearance, and shadows of objects rendered in the image, as compared with the display shown in FIG. 4A. In the first embodiment, the spectral radiance calculation unit 204 performs ray tracing, and the calculation result is held as the spectral radiance data 207. The preview generation unit 208 generates the preview data 209 based on the spectral radiance data 207 according to a procedure shown in FIG. 7 (to be described later).

Spectral Radiance Calculation Unit

The processing (S305) of the spectral radiance calculation unit 204 will be described with reference to a flowchart of FIG. 5 showing ray tracing.

In the first embodiment, based on the light source characteristics and object information in the scene, ray tracing is performed from the viewpoint for each pixel of an image of the scene, thereby calculating a spectral radiance. FIG. 5 shows ray tracing processing for one ray of interest. The processing shown in FIG. 5 is recursively called for each ray until it is detected that the ray strikes no object in the scene or the ray strikes the light source. Then, the spectral radiance of the pixel is determined by the average of spectral radiances calculated for respective rays. Processing of monochromatic light having a wavelength λ will be explained. The spectral radiance of each wavelength in the visible light range is obtained by performing the following processing for each wavelength in the visible light range.

The spectral radiance calculation unit 204 searches for a point (to be referred to as a "strike point" hereinafter) at which the ray of interest reflected from the start point of tracing strikes an object included in the scene (S501). The start point is a pixel or strike point. Note that the strike point is searched for by any desirable method. For example, it is only necessary to sequentially determine, for all objects in the scene, a point at which the ray of interest strikes, and set a point closest to the start point as a strike point.

The spectral radiance calculation unit 204 determines whether the ray of interest has struck the object or light source (S502), and also determines whether the ray of interest has struck the light source (S503). If the ray of interest has struck neither the object nor the light source, the spectral radiance of the ray of interest is set to 0 (S504), thereby terminating tracing of the ray of interest.

If the ray of interest has struck the light source, the spectral radiance calculation unit 204 calculates a spectral radiance $E_0(\lambda)$ of the ray of interest based on the intensity of the ray of interest and light source characteristics data (S505), given by:

$$E_0(\lambda) = P_0(\lambda) Q(\theta) S(\lambda) \quad (2)$$

where $P_0(\lambda)$ represents the intensity of the ray of interest,
θ represents the incident angle of the ray of interest,
$Q(\theta)$ represents the light distribution characteristics of the light source in the e direction, and
$S(\lambda)$ represents the spectral radiance of the light source.

Tracing of the ray of interest is then terminated. The calculated spectral radiance $E_0(\lambda)$ of the ray of interest is temporarily saved as the spectral radiance data 207 in a buffer for holding a ray tracing result, and is used for calculation of preview data for the pixel and calculation of color signal values.

The light source characteristics data $Q(\theta)$ and $S(\lambda)$ indicate the relationship between the exit direction and intensity of the ray at the light source. Therefore, the intensity of the ray from the light source is calculated based on an angle (incident angle) formed by the normal to the light source and the ray of interest entering the light source at the strike point.

If the ray of interest has struck the object, the CPU 101 acquires the reflection characteristics and transmission characteristics of the object (S506). The reflection characteristics include an angle (incident angle) formed by the normal to the object and the ray of interest entering the object at the strike point, and the relationship between the ray intensity and an angle (exit angle) formed by the normal and the ray exiting from the object.

Next, the spectral radiance calculation unit 204 determines the number of rays reflected from the strike point (S507), and calculates the direction and intensity of one ray (S508). The number of rays is arbitrary. However, as the number is larger, a less noisy image is finally obtained. In the case of diffuse reflection, the directions of the rays need only be uniformly distributed, and the intensity $P_r(\lambda_r)$ of reflected light and the intensity $P_t(\lambda_t)$ of transmitted light are calculated by:

$$P_r(\lambda_r) = P_0(\lambda_i) \times f_r(x, \omega_i, \lambda_r, \omega_r);$$

$$P_t(\lambda_t) = P_0(\lambda_i) \times f_t(x, \omega_i, \lambda_t, \omega_t); \quad (3)$$

where $P_0(\lambda_i)$ represents the intensity of a ray of a wavelength $\lambda_i$, which enters the object,
$f_r$ represents the reflection characteristics of the object, and
$f_t$ represents the transmission characteristics of the object.

In general, the intensity distribution of the reflected light depends on the surface shape of the object. As the surface of the object is smoother, the reflection intensity in the regular reflection direction, that is, a direction satisfying $\omega_i = \omega_r$ is higher, and the reflection intensities in other diffuse reflection directions are lower.

The reflection characteristics may be input from the storage unit 103 or the like, or input as a measurement result from the measurement unit 108. The data format of the reflection characteristics may be any desirable format as long as the reflectance of the object corresponding to the incident angle and exit angle of the light is obtained, and may be, for example, a unique function. Since diffuse reflection is isotropically distributed, the reflection characteristics of $\omega_i = 45°$ and $\omega_r = 0°$ may be applied to diffuse reflection, and an additionally prepared table may be applied to the reflection characteristics of regular reflection.

The reflection characteristics $f_r$ of the object are expressed by a bidirectional reflectance distribution function (BRDF) given by:

$$f_r(x,\omega_i,\lambda_r,\omega_r)=dL_r(x,\lambda_r,\omega_r)/\{L_i(x,\lambda_i,\omega_i)(\omega_r\cdot n)d\omega\} \quad (4)$$

where x represents a position on the object,
$\omega_i$ represents the incident angle,
$\lambda_i$ represents the wavelength of the incident ray,
$L_i$ represents the intensity of the incident ray,
$\omega_r$ represents the reflection angle,
$\lambda_r$ represents the wavelength of the exit ray,
$L_r$ represents the intensity of the exit ray, and
n represents the normal.

On the other hand, the transmission characteristics $f_t$ of the object are expressed by a bidirectional transmittance distribution function (BTDF) given by:

$$f_t(x,\omega_i,\lambda_r,\omega_t)=dL_t(x,\lambda_t,\omega_t)/\{L_i(x,\lambda_i,\omega_i)(\omega_t\cdot n)d\omega\} \quad (5)$$

where $\omega_t$ represents the refractive angle,
$\lambda_t$ represents the wavelength of the transmitted ray, and
$L_t$ represents the intensity of the transmitted ray.

In general, since the intensity distribution of the transmitted light depends on a spectral refractive index, when the refractive angle $\omega_t$ satisfies equation (1), the transmission intensity is highest. Note that the transmission characteristics need only be input from the storage unit 103 or the like. The data format of the transmission characteristics may be any desirable format as long as the transmittance of the object corresponding to the incident angle and refractive angle of the light is obtained, and may be, for example, a unique function. When $\omega_t$ is equal to the refractive angle, the transmission characteristics with $\omega_i=\omega_r=0°$ may be applied. For other transmission characteristics, an additionally prepared table may be applied.

Next, the spectral radiance calculation unit 204 executes ray tracing processing (S509). That is, in step S509, the ray tracing processing shown in FIG. 5 is recursively called for each ray, and executed. The spectral radiance calculation unit 204 determines whether ray tracing has ended for the number of rays set in step S507 (S510). If ray tracing has not ended, the process returns to step S508 to repeat the ray tracing processing.

The spectral radiance calculation unit 204 calculates the spectral radiance of the pixel as the average of the spectral radiances of the respective rays calculated in steps S504 and S505. That is, let N be the total number of rays, and $En(\lambda)$ (n is an integer of 0 to N−1) be the spectral radiance of each ray. Then, the spectral radiance $Ex(\lambda)$ of the pixel is calculated by:

$$Ex(\lambda)=1/N\cdot\{\Sigma_0^{n-1}En(\lambda)\} \quad (6)$$

Color Signal Calculation Unit

Figure 6:
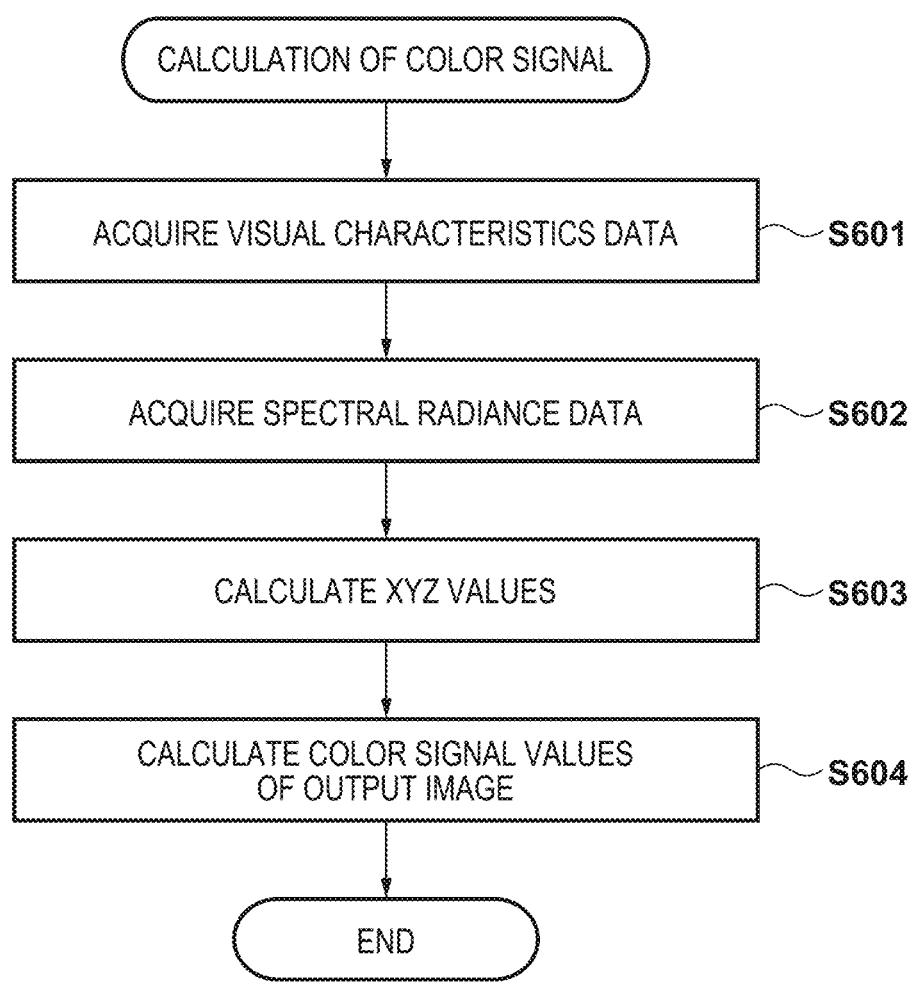
FIG. 6 is a flowchart illustrating color signal calculation processing.

The processing (S308) of the color signal calculation unit 206, that is, processing of converting the spectral radiance of the pixel into a color signal will be described with reference to a flowchart shown in FIG. 6. Note that sRGB values are used as the color signal values of an image in the following description. Other color signal values such as AdobeRGB values may be used.

The color signal calculation unit 206 acquires the visual characteristics data input in step S303 as visual characteristics to be used to convert the spectral radiance into a color signal (S601). For example, the color matching functions $\bar{x}(\lambda)$, $\bar{y}(\lambda)$, and $\bar{z}(\lambda)$ of the CIEXYZ color system are acquired.

Next, the color signal calculation unit 206 acquires the spectral radiance $Ex(\lambda)$ of the pixel of interest, which has been calculated in step S305 and held in the buffer as the spectral radiance data 207 for each pixel of the rendering image (S602). The spectral radiance of the pixel of interest is converted into CIEXYZ values using the color matching functions (S603), as given by:

$$X=k\int Ex(\lambda)\bar{x}(\lambda)d(\lambda);$$

$$Y=k\int Ex(\lambda)\bar{y}(\lambda)d(\lambda);$$

$$Z=k\int Ex(\lambda)\bar{z}(\lambda)d(\lambda); \quad (7)$$

where k represents a constant, and
the integration range is, for example, a human visible range (from 380 nm to 780 nm).

The color signal calculation unit 206 converts the CIEXYZ values of the pixel of interest into RGB signal values, and then converts the RGB signal values into sRGB signal values (S604), as given by:

$$\begin{bmatrix} R_{Linear} \\ G_{Linear} \\ B_{Linear} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} X \\ Y \\ Z \end{bmatrix} \quad (8)$$

if ($R_{Linear}\leq 0.0031308$)
$R=12.92\cdot R_{Linear}$;
else
$R=1.055\cdot R_{Linear}^{1.0/2.4}-0.055$;
if ($G_{Linear}\leq 0.0031308$)
$G=12.92\cdot G_{Linear}$;
else
$G=1.055\cdot G_{Linear}^{1.0/2.4}-0.055$;
if ($B_{Linear}\leq 0.0031308$)
$B=12.92\cdot B_{Linear}$;
else
$B=1.055\cdot B_{Linear}^{1.0/2.4}-0.055$;

The color signal calculation unit 206 performs the aforementioned processing for all the pixels of the rendering screen, thereby generating the image data 210 corresponding to the rendering screen, that is, CG.

Preview Generation Unit

Figure 7:
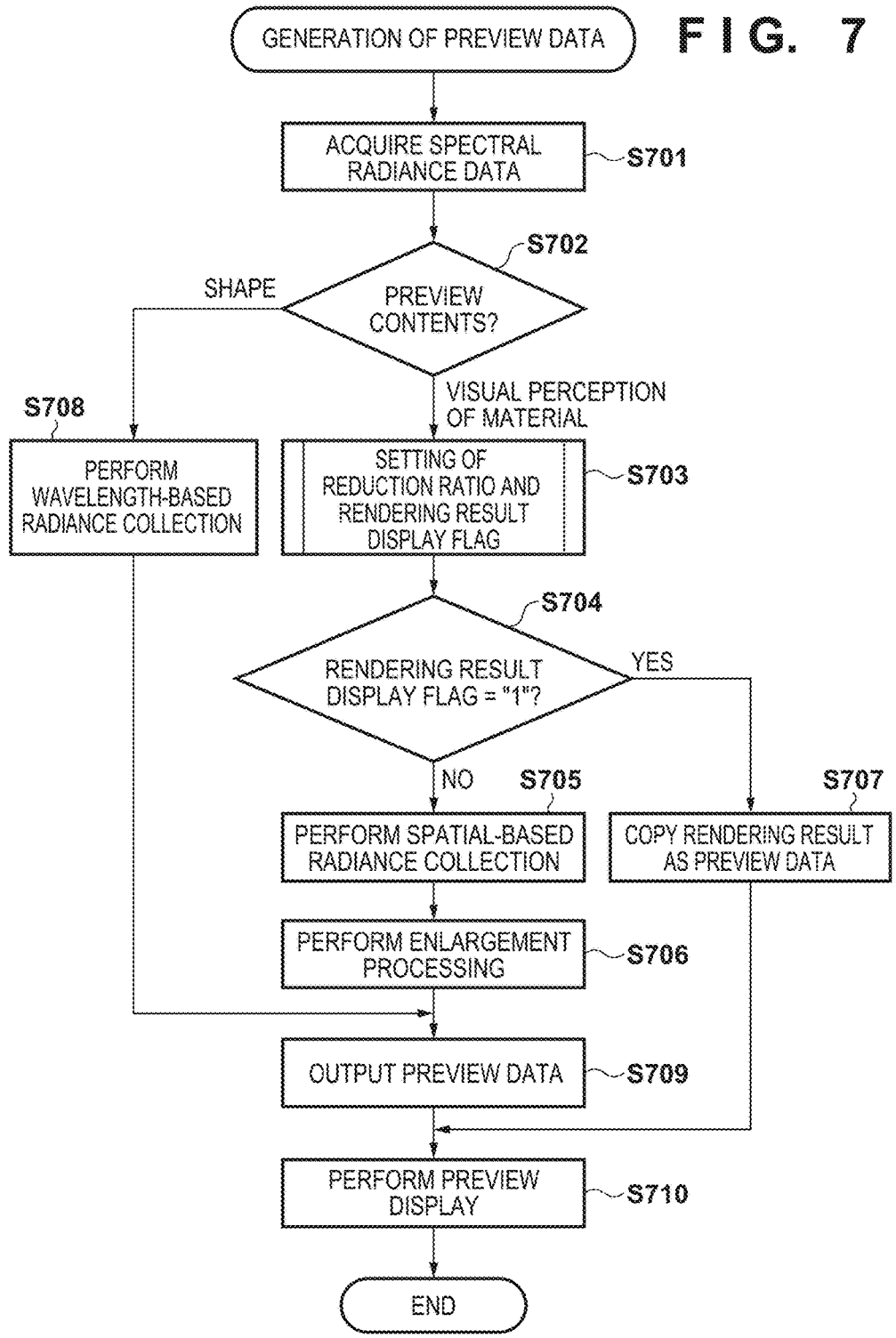
FIG. 7 is a flowchart illustrating preview data generation processing.

The processing (S306) of the preview generation unit 208 will be described with reference to a flowchart shown in FIG. 7. In the first embodiment, the progress of ray tracing is displayed by creating preview data to perform preview display for each pixel of interest determined in step S304.

The preview generation unit 208 acquires the spectral radiance data 207 necessary for generation of preview data (S701). The preview generation unit 208 loads the preview setting data 214, and discriminates, based on the value of the preview contents flag, contents (to be referred to as "preview contents" hereinafter) to be confirmed by the preview (S702). If the preview contents indicate the "shape", the process transits to step S708. If the preview contents indicate the "material appearance", the process transits to step S703.

If the preview contents indicate the "material appearance", the preview generation unit 208 determines a reduction ratio indicating the degree of reduction of the resolution of the spectral radiance data which has been acquired from the spectral radiance data 207 and is currently generated, to generate preview data (S703). A method of determining the reduction ratio will be described later.

The preview generation unit 208 determines whether a rendering result by ray tracing, that is, the spectral radiance data 207 can be used intact for preview display (S704). If preview display can be performed by the rendering result, the process transits to step S707; otherwise, the process transits to step S705.

The determination processing in step S704 is performed based on the rendering result display flag. Although details will be described later, the reduction ratio and rendering result display flag are set according to the current predicted value of the degree of progress (to be referred to as a predicted degree of progress hereinafter) of CG generation, as will be described later. If the spectral radiance data 207 has been calculated to the extent that it can be used intact for preview display, the rendering result display flag is set to "1", and if data is insufficient, the rendering result display flag is "0".

If preview display cannot be performed by the rendering result, the preview generation unit 208 collects spectral radiance data in accordance with the reduction ratio determined in step S703 with respect to the spectral radiance data which is currently generated and is saved as the spectral radiance data 207, thereby generating the preview data 209 (S705).

Figure 8A:
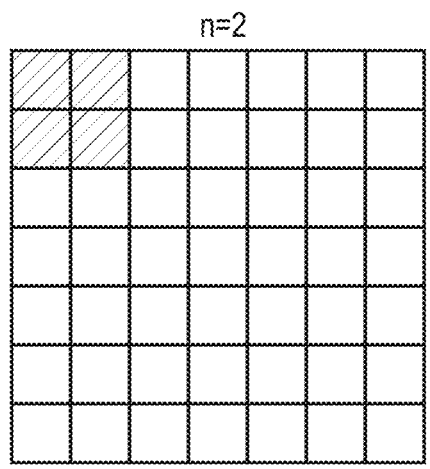
FIGS. 8A and 8B are views for explaining spatial-based radiance collection.
Figure 8B:
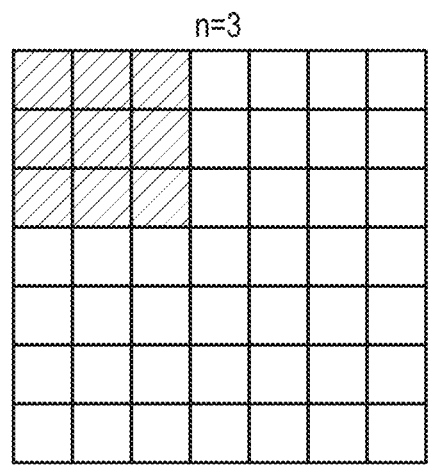

Collection of the spectral radiance data is equivalent to addition of the spectral radiance data of a plurality of pixels into the spectral radiance data of one pixel, and corresponds to reduction of an image. For example, if CG generation hardly progresses (for example, the predicted degree of progress <25%), the sum of the spectral radiance data of 3×3 pixels is handled as one pixel, as shown in FIG. 8B. If CG generation further progresses (for example, 25%≤the predicted degree of progress <50%), the sum of the spectral radiance data of 2×2 pixels is handled as one pixel, as shown in FIG. 8A. That is, FIG. 8B shows an example of the reduction ratio=3 and FIG. 8A shows an example of the reduction ratio=2. Note that the threshold (a predetermined ratio to be described later) of the predicted degree of progress may be empirically determined or arbitrarily set by the user. Collection of the spectral radiance data of a plurality of pixels may be referred to as "spatial-based collection" hereinafter.

The preview generation unit 208 performs enlargement processing for preview data generated by spatial-based collection in step S705 so as to have the same size as that of CG currently generated (S706). An enlargement method may be any method such as a bicubic method or nearest neighbor method. The enlarged preview data is stored as the preview data 209 in the main memory 102 or the like (S709). By reducing/enlarging the image while maintaining the spectral radiance, the scene can be reproduced by a preview while emphasizing the "material appearance" of the object in the scene.

On the other hand, if the rendering result is preview-displayed intact, the preview generation unit 208 copies the spectral radiance data 207 as the preview data 209 (S707).

If it is determined in step S702 that the preview contents indicate the "shape" of the object, the preview generation unit 208 collects the spectral radiance data 207 currently generated, for each pixel in each unit of a predetermined wavelength range (S708). For example, in the visible light range, the spectral radiance data of each pixel are summed, and the sum is set as the radiance value of the pixel. Alternatively, the sum of the spectral radiance data for each pixel in each unit of a predetermined wavelength range may be set as the radiance value of a representative wavelength in the range. With this processing, color components are lost from the spectral radiance data as the base of color information but radiance information in the pixel can be increased. Consequently, preview display is monotone display (or display with insufficient color reproduction) but the scene can be reproduced while emphasizing the "shape" of the object in the scene, thereby reproducing the display state shown in FIG. 4B more quickly. The preview generation unit 208 copies the collected spectral radiance data as the preview data 209 (S709). Note that collection of the spectral radiance data in each unit of a wavelength range may be referred to as "wavelength-based collection" hereinafter.

The preview generation unit 208 performs preview display by displaying an image represented by the preview data 209 on the monitor 111 (S710). At this time, if the progress of CG rendering is sufficient, the rendering result is preview-displayed intact; otherwise, a rendering result of a low resolution is enlarged and displayed.

Setting of Reduction Ratio and Rendering Result Display Flag

Figure 9:
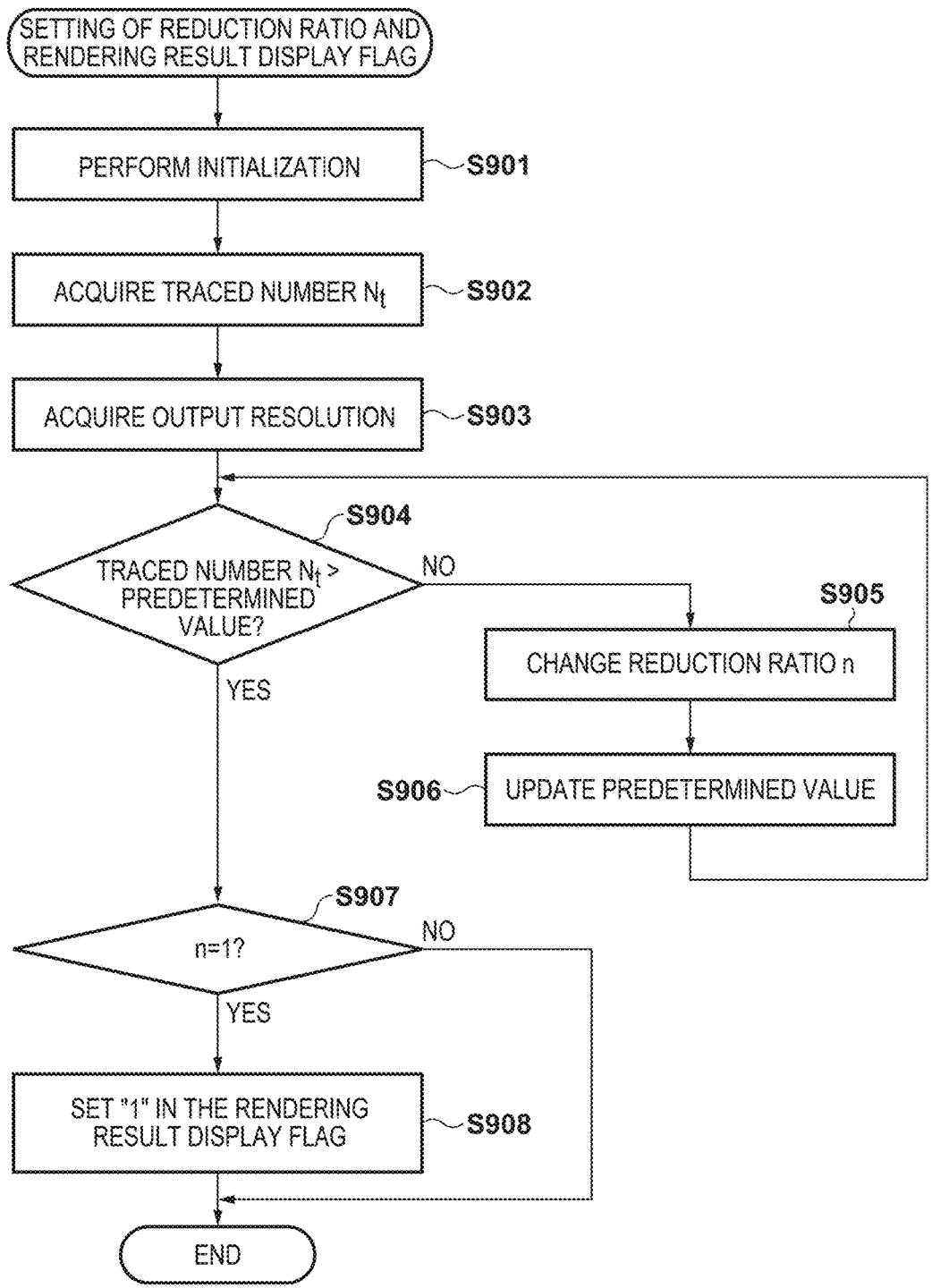
FIG. 9 is a flowchart illustrating processing of setting a reduction ratio and a rendering result display flag.

The processing (S703) of setting the reduction ratio and rendering result display flag will be described with reference to a flowchart shown in FIG. 9. When generating the preview data 209 to reproduce the material appearance of the object, the preview generation unit 208 determines whether to reduce an image and the degree of reduction.

The preview generation unit 208 initializes the reduction ratio when creating the preview data 209 (S901). A reduction ratio n is indicated as $1/n^2$ with respect to the output resolution of CG (image data 210) to be generated, and is updated according to the predicted degree of progress, as needed. At the time of initialization in step S901, the reduction ratio n=1 is set. Furthermore, at the time of initialization, a largest one of a plurality of prepared values is set as a predetermined value (to be described later), and the rendering result display flag is initialized to "0".

The preview generation unit 208 acquires the number of executions (to be referred to as a "traced number Nt" hereinafter) of ray tracing until now for CG to be generated (S902). The traced number Nt is acquired based on, for example, the number of loops of processing based on the determination processing (determination of whether there is a pixel for which spectral radiance calculation is not complete) in step S307. A number obtained by multiplying the number of loops corresponding to the number of processing pixels by a number Ns (fixed value) of rays for each pixel determined in step S507 is set as the traced number Nt.

The preview generation unit 208 acquires the output resolution of CG to be generated (S903). The output resolution need only be defined by a predetermined value. Note that by using the quotient obtained by dividing the number Ns (fixed value) of rays by the number of loops, the output resolution is preferably obtained by dividing a number H of vertical pixels and a number W of horizontal pixels of CG by the quotient.

The preview generation unit 208 determines whether the traced number Nt acquired in step S902 exceeds the set predetermined value (S904). The predetermined value defines, for example, 50%, 25%, . . . , or the like of the required number (number H of vertical pixels×number W of horizontal pixels×number Ns of rays) (to be referred to as a "required number Nr of tracing" hereinafter) of ray tracing operations in the whole CG as a value indicating the degree of progress of CG rendering. In other words, (traced number Nt/required number Nr of tracing)×100 indicates the "predicted degree of progress", and a value such as 50% or 25% indicates the "predetermined ratio".

If CG includes 600 vertical pixels and 800 horizontal pixels and the number Ns of rays is 1,000, the predetermined values are 240,000,000, 120,000,000, . . . corresponding to 50%, 25%, . . . of the required number Nr of tracing, and the largest predetermined value is selected in step S901. Note that the number of predetermined values and the determination method are not limited to the above ones. If the traced number Nt is larger than the predetermined value, the process transits to step S907; otherwise, the process transits to step S905.

In step S905, the reduction ratio n is changed to a larger value. For example, the reduction ratio n is incremented to n+1. The preview generation unit 208 sets a smaller predetermined value as the predetermined value (S906). For example, if 240,000,000 is set as the predetermined value, the predetermined value is updated to 120,000,000. After that, the process returns to step S904, and the reduction ratio n is set in accordance with the degree of progress of CG rendering by the loop of steps S904, S905, and S906. As described above, as the traced number Nt increases, the resolution of preview display becomes closer to the output resolution in stages.

On the other hand, if the traced number Nt>the predetermined value, the preview generation unit 208 determines whether the resolution of preview display is equal to the output resolution of the CG acquired in step S903 (S907). That is, it is determined whether the reduction ratio n=1. If n=1, it is considered that the spectral radiance data 207 sufficient for preview display has been calculated by rendering until now, and "1" is set in the rendering result display flag (S908).

The rendering result display flag is a 1-bit flag which is referred to in step S704 when determining whether to generate the preview data 209, and has been initialized to "0" in step S901. That is, if the rendering result display flag is "1", the rendering result is used intact for preview display. If the rendering result display flag is "0", the preview data 209 is created. If it is not determined in step S907 that the reduction ratio n=1, the process ends while the rendering result display flag remains "0".

As described above, during CG generation by the ray tracing method, a CG image is reconstructed by spatial-based collection at the reduction ratio n according to the current degree of progress of the processing, thereby performing preview display. This allows the user to confirm more detailed material appearance of the object included in the scene during CG generation, thereby implementing efficient CG generation. If it is necessary to confirm the shape of the object included in the scene, the CG image is reconstructed by wavelength-based collection, thereby performing preview display. Therefore, the user can confirm a more detailed shape of the object included in the scene during CG generation, thereby allowing efficient CG generation.

Note that a case in which preview display is performed every time one pixel is processed has been explained above. However, preview display may be performed every time a plurality of pixels are processed. In this case, it can be expected to improve the processing speed.

Second Embodiment

The second embodiment of the present invention will be described below. The arrangement of an information processing apparatus according to the second embodiment is the same as in the above-described first embodiment and a description thereof will be omitted. Especially, differences from the first embodiment will be explained below. In the second embodiment, localization of ray trace directions is suppressed by determining a trace direction for each range obtained by dividing the trace direction range in ray tracing. In other words, the distribution of trace directions in ray tracing is controlled.

Figure 10:
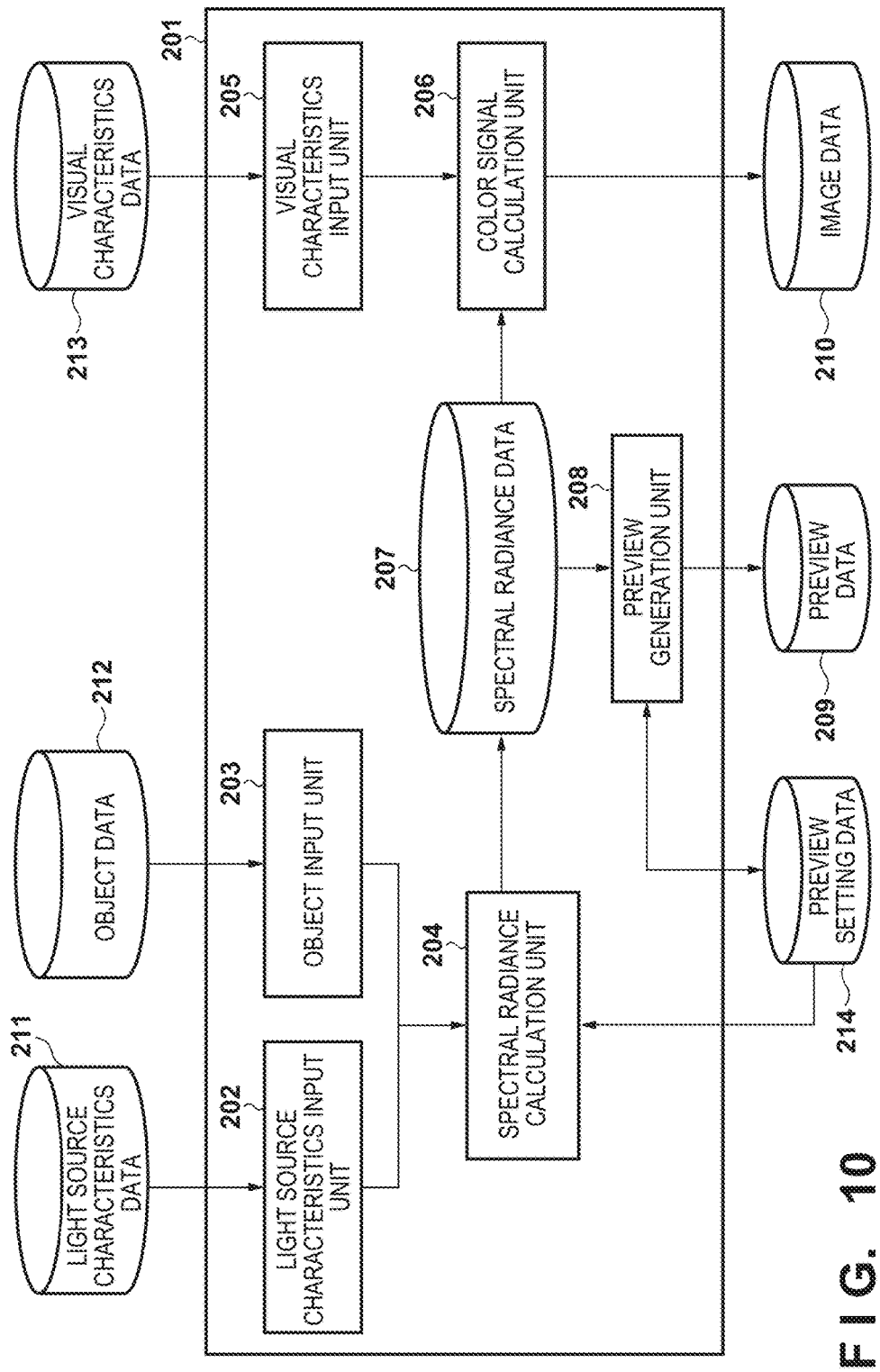
FIG. 10 is a block diagram showing the processing arrangement of an image processing apparatus according to the second embodiment.

FIG. 10 is a block diagram showing the processing arrangement of an image processing apparatus 201 according to the second embodiment. Referring to FIG. 10, a difference from the first embodiment is that a spectral radiance calculation unit 204 refers to preview setting data 214. That is, the preview setting data 214 is input to the spectral radiance calculation unit 204 in addition to light source characteristics data 211 and object data 212.

Figure 11:
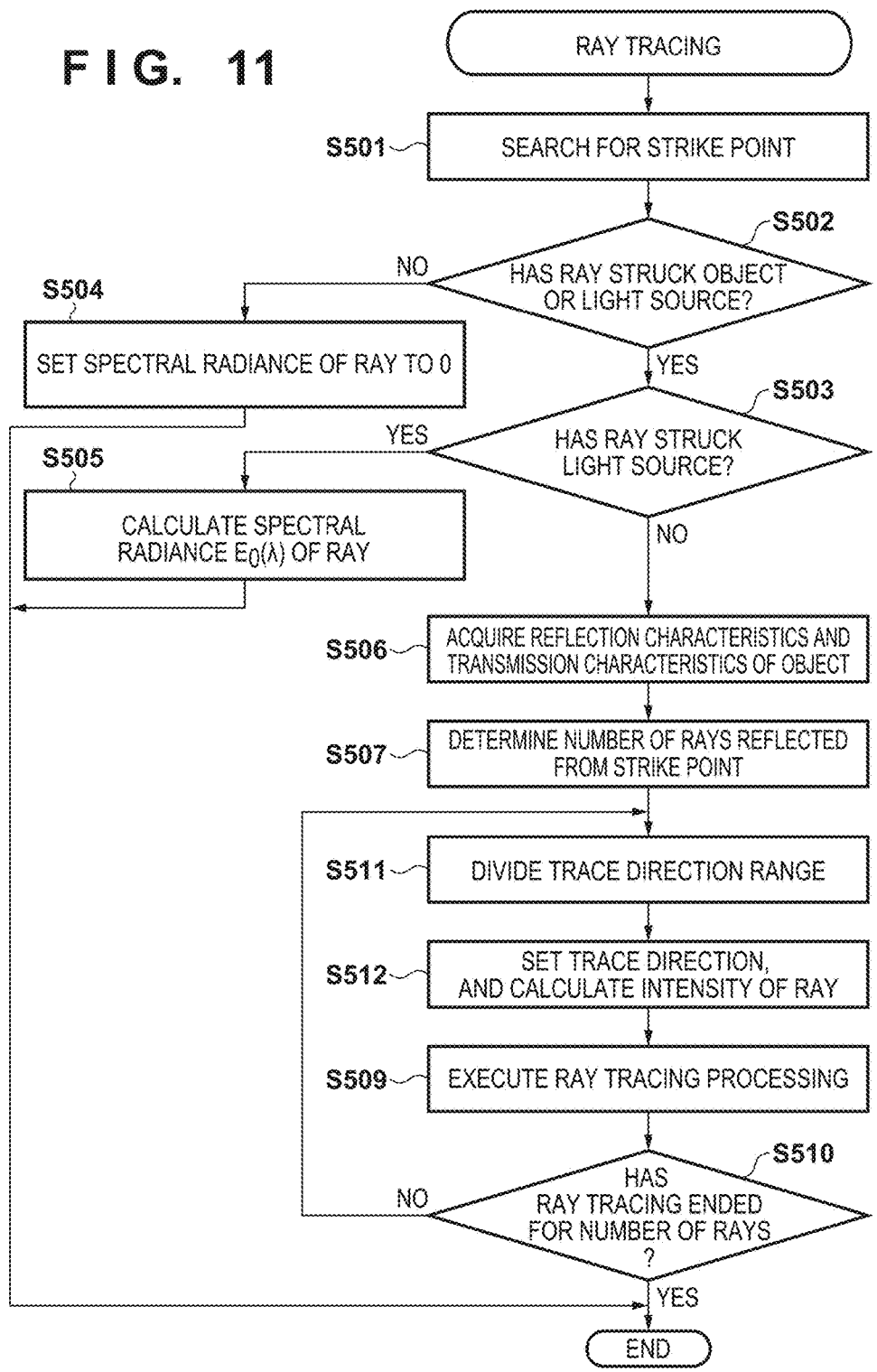
FIG. 11 is a flowchart illustrating ray tracing processing according to the second embodiment.

FIG. 11 is a flowchart illustrating ray tracing processing according to the second embodiment. To calculate the spectral radiance of a pixel (S305), the spectral radiance calculation unit 204 determines a trace direction (S511), and calculates the direction and intensity of a ray (S512). These points are different from the first embodiment.

In general, when generating an image by the ray tracing method, as rays are emitted in more directions from each pixel forming CG, a less noisy image is obtained. Consequently, if preview data is created while the number of executions of ray tracing of the pixel of interest is small, ray directions are probably localized in the pixel of interest, and an image represented by the preview data may include more noise. To avoid such noise, it is necessary to create a state in which the rays are emitted in more directions when generating preview data. To do this, in the second embodiment, the trace direction range of the ray is divided in step S511.

In step S512, a trace direction is set to calculate the intensity of the ray. The intensity is calculated, similarly to step S508 in the first embodiment. The trace direction is set for each divided range in consideration of division of the trace direction range determined in step S511. That is, the ray trace directions are varied so that they are not localized in one of the ranges divided in step S511.

Division of Trace Direction Range

Figure 12:
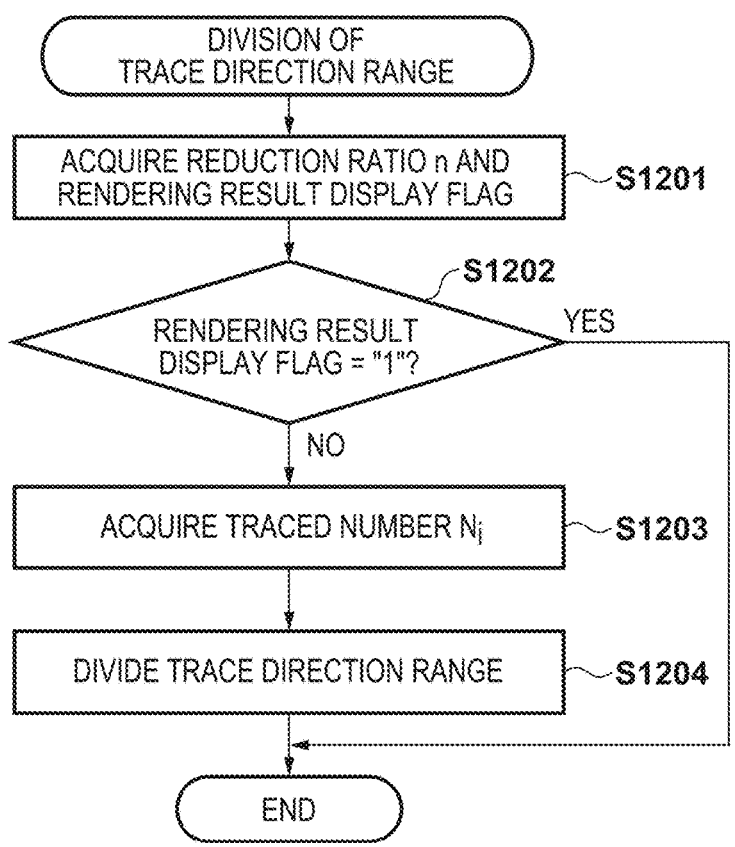
FIG. 12 is a flowchart illustrating trace direction range division processing.

The processing (S511) of dividing the trace direction range will be described with reference to a flowchart shown in FIG. 12. The spectral radiance calculation unit 204 acquires a rendering result display flag and a reduction ratio n from the preview setting data 214 (S1201). Note that the rendering result display flag and reduction ratio n acquired in step S1201 have been set in the preview display processing (S306) of a pixel immediately preceding the pixel of interest.

The spectral radiance calculation unit 204 determines whether the rendering result display flag is "1" (S1202). If the flag is "1", the process ends without dividing the trace direction range. If the flag is "0", the number (to be referred to as a "traced number Ni" hereinafter) of executions of ray tracing in the pixel of interest is acquired (S1203). The traced number Ni is acquired from the number of loops based on the determination processing in step S307, similarly to the processing in step S902 of the first embodiment.

The spectral radiance calculation unit 204 divides the trace direction range based on the reduction ratio n acquired in step S1201 and the traced number Ni acquired in step S1203 (S1204). For example, a division number Nd of the trace direction range is determined by:

if $(Ns/(k \times Ni) > 1)$
$R = \text{int}\{Ns/(k \times Ni)\}$;
else
$R = 1$;

$$Nd = n^2 \times R;\qquad(10)$$

where Ni represents the number of rays, k represents a constant (a positive integer), and
int( ) represents a function of extracting a integer part.

Figure 13A:
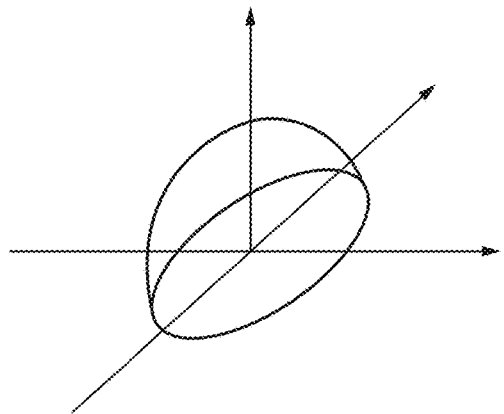
FIGS. 13A and 13B are views each showing division of a trace direction range.
Figure 13B:
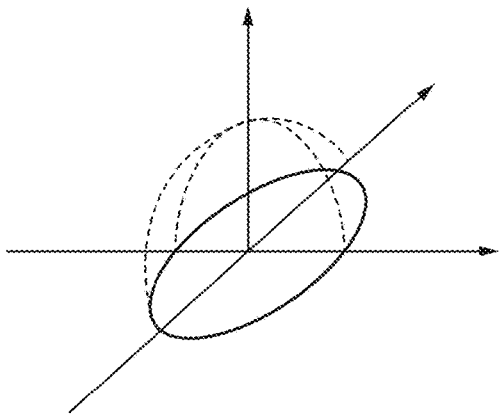

For example, if the reduction ratio n=2, when spatial-based collection is performed, preview data obtained by summing four adjacent pixels is generated. In this case, assuming Ns=1,000 and k=10, R=10 and Nd=$2^2 \times 10$=40 if Ni=10, the trace direction range is divided into 40 regions, and trace directions are evenly selected for the respective divided regions. When ray tracing progresses and Ni=100 holds, R1=1 and Nd=$2^2 \times 1$=4, the trace direction range is divided into four regions, as shown in FIG. 13B, and trace directions are evenly selected for the respective divided regions. Note that the origin of a coordinate system shown in FIG. 13A or 13B is a strike point.

The division number Nd of the trace direction range is determined so that the trace directions are evenly distributed as much as possible with respect to the traced number Ni and the reduction ratio n. Therefore, as the traced number Ni is smaller and the reduction ratio n is larger, the division number Nd of the trace direction range increases. Note that if the rendering result display flag is "1", the trace direction range is not divided, as shown in FIG. 13A.

As described above, by dividing the trace direction range in accordance with the traced number Ni and the reduction ratio n of the preview data, it is possible to avoid localization of trace directions at the time of ray tracing and suppress noise in preview display during ray tracing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc® (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-202120 filed Sep. 30, 2014 which is hereby incorporated by reference herein in its entirety.

What is claimed is:

1. An image processing apparatus for generating an image of a scene, the image processing apparatus comprising:
   a first calculation unit configured to calculate, for each pixel of an image of a scene, based on light source characteristics and object information in the scene, spectral radiance data by performing ray tracing from a viewpoint;
   a determination unit configured to determine, during performing of the ray tracing, whether contents to be confirmed by a user by a preview indicate a shape of an object;
   a generation unit configured to, in a case that the determination unit determines that the contents to be confirmed by the user by the preview indicate the shape of the object, (1) acquire, before completion of the calculation by the first calculation unit, the spectral radiance data that the first calculation unit calculates and temporarily saves before completion of the calculation by the first calculation unit, and (2) generate preview data of the image of the scene by performing a wavelength-based collection of the acquired spectral radiance data that the first calculation unit calculates and temporarily saves before completion of the calculation by the first calculation unit;
   a display control unit configured to display, on a display unit, a preview image represented by the generated preview data; and
   a second calculation unit configured to acquire all pieces of the spectral radiance data after the completion of the calculation by the first calculation unit, and to calculate color signal values of pixels of the image of the scene based on the acquired all pieces of the spectral radiance data to generate the image of the scene,
   wherein the preview image represented by the generated preview data is different from the image of the scene generated by the second calculation unit, and
   wherein at least one of the first calculation unit, the determination unit, the generation unit, the display control unit, or the second calculation unit is implemented using a processor.

2. The image processing apparatus according to claim 1, wherein the determination unit determines whether the contents to be confirmed by the user indicate material appearance of the object,
   wherein, in a case that the determination unit determines that the contents to be confirmed by the user indicate the material appearance of the object, the generation unit performs a spatial-based collection of the spectral radiance data calculated by the first calculation unit, and
   wherein, in the spatial-based collection, the generation unit sets a reduction ratio according to a degree of progress of the ray tracing, and generates the preview data according to the reduction ratio using the spectral radiance data.

3. The image processing apparatus according to claim 2, wherein the generation unit sets the reduction ratio based on (a) a required number of the ray tracing to calculate the spectral radiance data of the image of the scene and (b) a number of executions of the ray tracing.

4. The image processing apparatus according to claim 3, wherein the generation unit sets the reduction ratio so that, in accordance with increase in the number of executions of the ray tracing, a resolution of the preview data approaches stepwise to a resolution of the image of the scene.

5. The image processing apparatus according to claim 2, wherein the generation unit generates preview data of a pixel by calculating the sum of the spectral radiance data of a number of pixels according to the reduction ratio.

6. The image processing apparatus according to claim 2, wherein the first calculation unit controls, based on (a) a number of executions of the ray tracing in the pixel of interest and (b) the reduction ratio in a pixel on which the ray tracing is performed immediately before the ray tracing in the pixel of interest, a distribution of tracing direction of the ray tracing in a pixel of interest.

7. The image processing apparatus according to claim 6, wherein the first calculation unit divides a tracing direction range of the ray tracing in the pixel of interest, based on (a) the number of executions and (b) the reduction ratio, so as to assign a tracing direction for each divided range.

8. The image processing apparatus according to claim 1, wherein, in the wavelength-based collection, the generation unit generates the preview data by calculating the sum of the spectral radiance data of a pixel in a unit of a predetermined wavelength range.

9. The image processing apparatus according to claim 8, wherein the predetermined wavelength range comprises a visible wavelength range.

10. The image processing apparatus according to claim 1, wherein the second calculation unit calculates, using color matching functions, the color signal values of the pixels of the image of the scene.

11. The image processing apparatus according to claim 1, wherein the determination unit determines whether the contents to be confirmed by the user indicate material appearance of the object, and
wherein, in a case that the determination unit determines that the contents to be confirmed by the user indicate the material appearance of the object, the generation unit generates the preview data of the image of the scene by performing a spatial-based collection of the spectral radiance data calculated by the first calculation unit.

12. The image processing apparatus according to claim 1, wherein, in the wavelength-based collection, the generation unit calculates the sum of the spectral radiance data of a pixel in a unit of a predetermined wavelength range to obtain a radiance value of a representative wavelength in the range.

13. The image processing apparatus according to claim 1, wherein, in the wavelength-based collection, the generation unit generates the preview data representing a monotone image.

14. An image processing method of generating an image of a scene, the image processing method comprising:
using a processor to:
(1) calculate in a first calculation, for each pixel of an image of a scene, based on light source characteristics and object information in the scene, spectral radiance data by performing ray tracing from a viewpoint;
(2) determine, during performing of the ray tracing, whether contents to be confirmed by a user by a preview indicate a shape of an object;
(3) in a case that it is determined that the contents to be confirmed by the user by the preview indicate the shape of the object, (a) acquire, before completion of the first calculation, the spectral radiance data that the first calculation calculates and temporarily saves before completion of the calculation by the first calculation, and (b) generate preview data of the image of the scene by performing a wavelength-based collection of the acquired spectral radiance data that the first calculation calculates and temporarily saves before completion of the first calculation;
(4) display, on a display unit, a preview image represented by the generated preview data;
(5) acquire all pieces of the spectral radiance data after the completion of the first calculation; and
(6) calculate, in a second calculation, color signal values of pixels of the image of the scene based on the acquired all pieces of the spectral radiance data to generate the image of the scene,
wherein the preview image represented by the generated preview data is different from the image of the scene generated by the second calculation.

15. The image processing method according to claim 14, wherein it is determined whether the contents to be confirmed by the user indicate material appearance of the object, and
wherein, in a case that it is determined that the contents to be confirmed by the user indicate the material appearance of the object, the preview data of the image of the scene is generated by performing a spatial-based collection of the calculated spectral radiance data.

16. The image processing method according to claim 14, wherein, in the wavelength-based collection, the generated preview data represents a monotone image.

17. A non-transitory computer readable medium storing a computer-executable program for causing a computer to perform an image processing method, the image processing method comprising steps of:
calculating in a first calculation, for each pixel of an image of a scene, based on light source characteristics and object information in the scene, spectral radiance data by performing ray tracing from a viewpoint;
determining, during performing of the ray tracing, whether contents to be confirmed by a user by a preview indicate a shape of an object;
in a case that it is determined that the contents to be confirmed by the user by the preview indicate the shape of the object, (a) acquiring, before completion of the first calculation, the spectral radiance data that the first calculation calculates and temporarily saves before completion of the calculation by the first calculation, and (b) generating preview data of the image of the scene by performing a wavelength-based collection of the acquired spectral radiance data that the first calculation calculates and temporarily saves before completion of the first calculation;
displaying, on a display unit, a preview image represented by the generated preview data;
acquiring all pieces of the spectral radiance data after the completion of the first calculation; and
calculating, in a second calculation, color signal values of pixels of the image of the scene based on the acquired all pieces of the spectral radiance data to generate the image of the scene,
wherein the preview image represented by the generated preview data is different from the image of the scene generated by the second calculation.

18. The non-transitory computer readable medium according to claim 17, wherein it is determined whether the contents to be confirmed by the user indicate material appearance of the object, and
wherein, in a case that it is determined that the contents to be confirmed by the user indicate the material appearance of the object, the preview data of the image of the scene is generated by performing a spatial-based collection of the calculated spectral radiance data.

19. The non-transitory computer readable medium according to claim 17, wherein, in the wavelength-based collection, the generated preview data represents a monotone image.

* * * * *